United States Patent
Hyoki et al.

(10) Patent No.: US 8,970,913 B2
(45) Date of Patent: Mar. 3, 2015

(54) PRINTING SYSTEM AND IMAGE FORMING APPARATUS AND METHOD THAT CHECK A PRECISION OF A FORMED IMAGE

(75) Inventors: Kenji Hyoki, Kanagawa (JP); Toshiyuki Kazama, Kanagawa (JP); Masaki Fujise, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 158 days.

(21) Appl. No.: 13/567,802

(22) Filed: Aug. 6, 2012

(65) Prior Publication Data

US 2013/0235396 A1  Sep. 12, 2013

(30) Foreign Application Priority Data

Mar. 8, 2012  (JP) .................................. 2012-051895

(51) Int. Cl.
*G06F 15/00* (2006.01)
*H04N 1/40* (2006.01)

(52) U.S. Cl.
USPC ............................. 358/3.28; 358/1.9; 382/100

(58) Field of Classification Search
USPC ........ 358/1.9, 1.18, 540, 3.28, 1.14; 382/100, 382/232; 380/210, 287, 54; 713/176; 480/460; 386/94; 399/366; 283/902; 726/26, 31
See application file for complete search history.

(56) References Cited

U.S. PATENT DOCUMENTS

| | | | |
|---|---|---|---|
| 5,257,119 A | 10/1993 | Funada et al. | |
| 2002/0085238 A1* | 7/2002 | Umeda | 358/3.28 |
| 2008/0144115 A1* | 6/2008 | Ishii | 358/3.28 |
| 2008/0304701 A1 | 12/2008 | Nakai et al. | |
| 2009/0010487 A1 | 1/2009 | Maeno | |
| 2012/0243796 A1 | 9/2012 | Saito | |
| 2013/0064580 A1 | 3/2013 | Igarashi et al. | |

FOREIGN PATENT DOCUMENTS

| | | |
|---|---|---|
| EP | 1 400 922 A1 | 9/2003 |
| JP | 04-294682 A | 10/1992 |
| JP | 2007-033247 A | 2/2007 |
| JP | 2007-043596 A | 2/2007 |
| JP | 2008-211616 A | 9/2008 |
| JP | 2008-306461 A | 12/2008 |

OTHER PUBLICATIONS

Australian Office Action issued Nov. 1, 2013 in corresponding Australian Patent Application No. 2012216251.

* cited by examiner

*Primary Examiner* — Barbara Reinier
(74) *Attorney, Agent, or Firm* — Sughrue Mion, PLLC

(57) ABSTRACT

A printing system includes the following elements. An addition unit creates additional image data having a specific attribute and adds it to original image data, thereby creating document image data. An image forming unit forms a document image including an original image and an additional image on a recording medium on the basis of the document image data. An image reader reads the document image, thereby creating read image data. A difference image creator creates difference image data by calculating a difference between the original image data and the read image data. A canceling unit corrects, on the basis of the specific attribute, the difference image data by canceling a difference generated due to the addition of the additional image data, thereby creating corrected difference image data. An inspection unit performs inspection to find a defect of the original image on the basis of the corrected difference image data.

14 Claims, 15 Drawing Sheets

INSIDE-FRAME ADDITIONAL IMAGE
(CODE IMAGE)

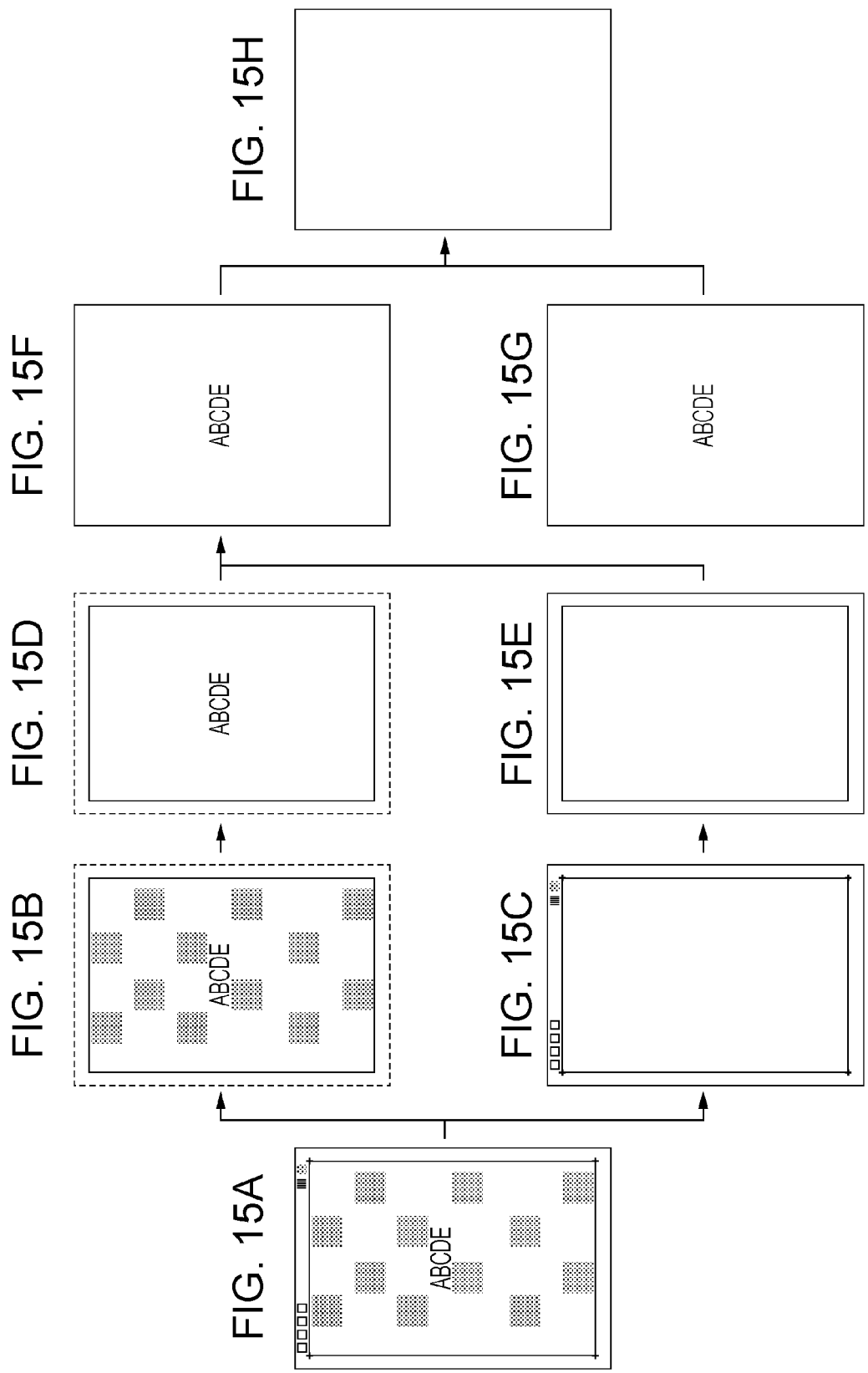

PRINTING SYSTEM AND IMAGE FORMING APPARATUS AND METHOD THAT CHECK A PRECISION OF A FORMED IMAGE

CROSS-REFERENCE TO RELATED APPLICATIONS

This application is based on and claims priority under 35 USC 119 from Japanese Patent Application No. 2012-051895 filed Mar. 8, 2012.

BACKGROUND

Technical Field

The present invention relates to a printing system and an image forming apparatus and method.

SUMMARY

According to an aspect of the invention, there is provided a printing system including the following elements. An addition unit creates additional image data having a specific attribute, to be added to original image data input from an external source, and adds the additional image data to the original image data so as to create document image data. An image forming unit forms, on a recording medium, on the basis of the document image data, a document image including an original image associated with the original image data and an additional image associated with the additional image data. An image reader reads the document image formed on the recording medium by the image forming unit so as to create read image data. A difference image creator creates difference image data by calculating a difference between the original image data and the read image data. A canceling unit corrects, on the basis of the specific attribute of the additional image data, the difference image data by canceling a difference generated due to the addition of the additional image data so as to create corrected difference image data. An inspection unit performs inspection to find a defect of the original image included in the document image formed on the recording medium by the image forming unit, on the basis of the corrected difference image data.

BRIEF DESCRIPTION OF THE DRAWINGS

Exemplary embodiments of the present invention will be described in detail based on the following figures, wherein:

FIGS. 15A through 15H illustrate a procedure for creating difference image data from read image data and checking original image data in the second exemplary embodiment.

DETAILED DESCRIPTION

Exemplary embodiments of the present invention will be described below in detail with reference to the accompanying drawings.

First Exemplary Embodiment

Figure 1:
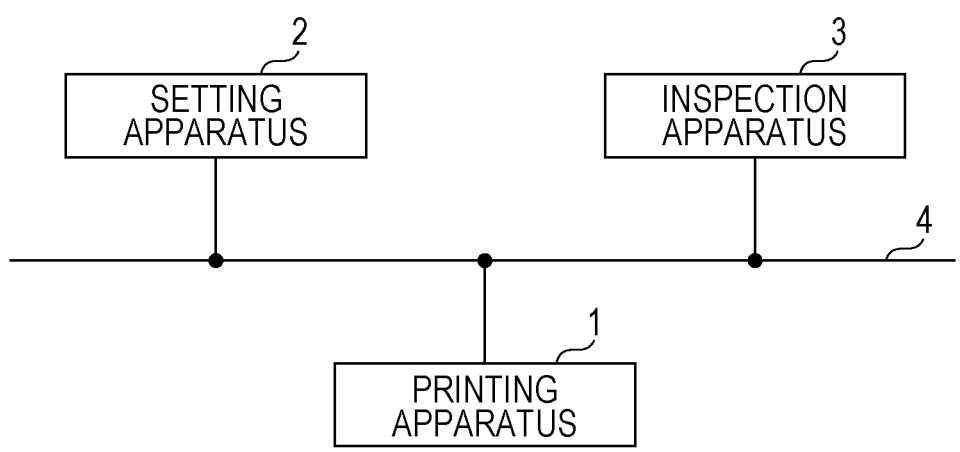
FIG. 1 illustrates the configuration of a printing system according to an exemplary embodiment.

FIG. 1 illustrates the configuration of a printing system according to an exemplary embodiment.

The printing system of the first exemplary embodiment includes a printing apparatus 1, a setting apparatus 2, an inspection apparatus 3, and a network 4. The printing apparatus 1 prints an image on a sheet of paper. The setting apparatus 2 sets image data (original image data) representing an image to be printed by the printing apparatus 1 and also sets printing conditions for the image data. The inspection apparatus 3 inspects the content of an image which has been printed on a sheet of paper (printed image) by the printing apparatus 1. The network 4 connects the printing apparatus 1, the setting apparatus 2, and the inspection apparatus 3.

Figure 2:
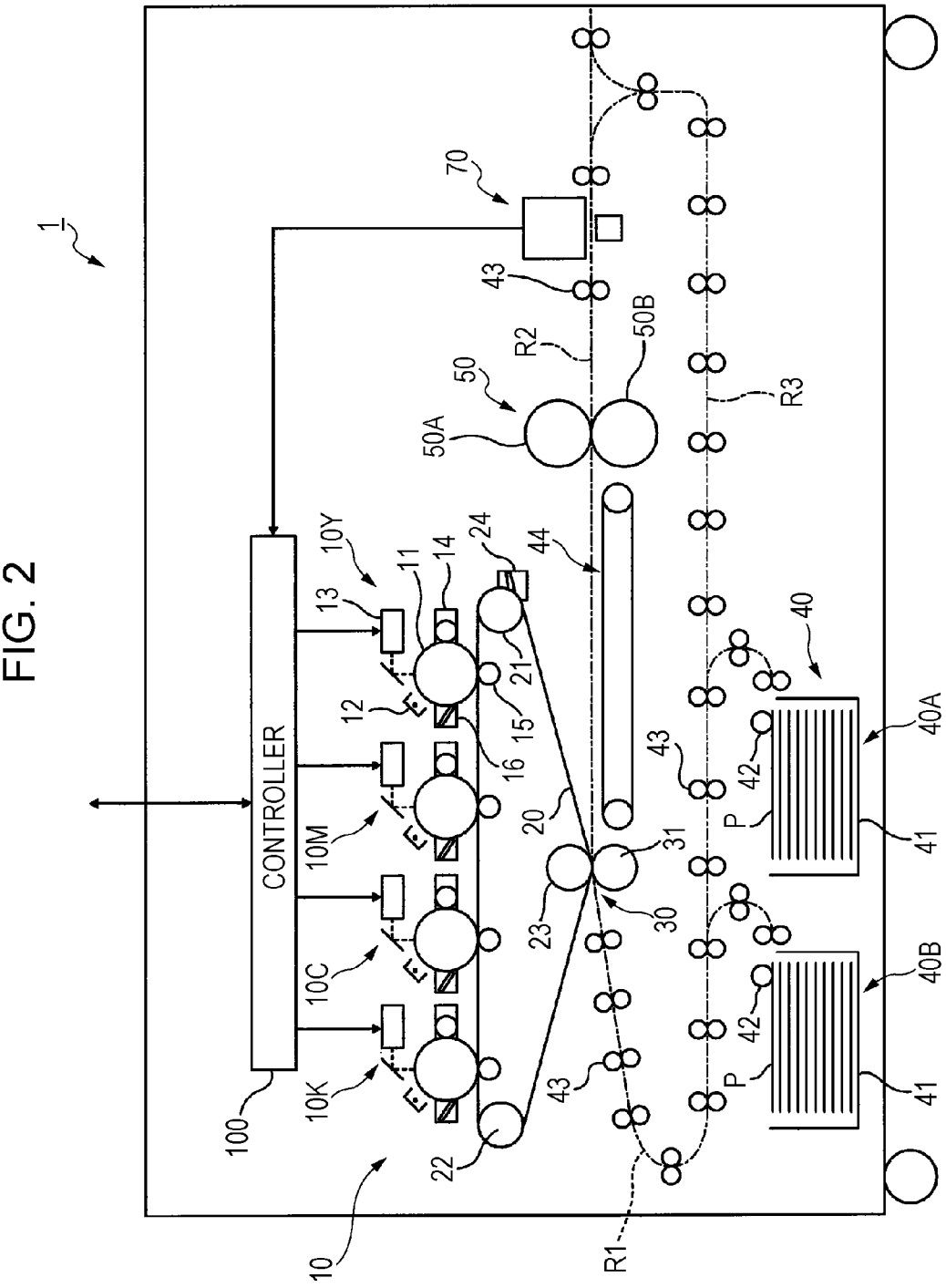
FIG. 2 illustrates the configuration of a printing apparatus.

FIG. 2 illustrates the configuration of the printing apparatus 1. The printing apparatus 1 of the first exemplary embodiment is a direct-to-press printing apparatus that prints images by using an electrophotographic system (i.e., a printer which does not use printing plates).

The printing apparatus 1 is a so-called tandem printing apparatus, and includes plural image forming units 10Y, 10M, 10C, and 10K that form toner images of the associated color components (yellow, magenta, cyan, and black, respectively). The printing apparatus 1 also includes a controller 100. The controller 100 includes a central processing unit (CPU), a read only memory (ROM), a random access memory (RAM), etc., and controls individual elements forming the printing apparatus 1 and operations (including image processing) performed by the individual elements.

The printing apparatus 1 also includes an intermediate transfer belt 20 and a second transfer device 30. Toner images of the individual color components formed by the image forming units 10Y, 10M, 10C, and 10K are sequentially transferred to and held on the intermediate transfer belt 20 (first transfer operation). The second transfer device 30 simultaneously transfers the toner images held on the intermediate transfer belt 20 onto a sheet of paper P formed in a rectangular shape, which is an example of a recording medium (second transfer operation).

The plural image forming units 10Y, 10M, 10C, and 10K each include a photoconductor drum 11, which is rotatably attached to the associated image forming unit. The image forming units 10Y, 10M, 10C, and 10K also each include, around the photoconductor drum 11, a charging device 12, an exposure device 13, and a developing device 14. The charging device 12 charges the photoconductor drum 11. The exposure device 13 exposes the photoconductor drum 11 to light and thereby forms an electrostatic latent image on the photoconductor drum 11. The developing device 14 visualizes the electrostatic latent image formed on the photoconductor drum 11 by using the associated color of toner so as to form a toner image. The image forming units 10Y, 10M, 10C, and 10K also each include a first transfer device 15 and a drum cleaner 16. The first transfer device 15 transfers the associated color of toner image formed on the photoconductor drum 11 onto the intermediate transfer belt 20. The drum cleaner 16 removes toner remaining on the photoconductor drum 11 which has not been transferred to the intermediate transfer belt 20.

The intermediate transfer belt 20 is rotatably stretched along three roller members 21, 22, and 23, which are also rotatably provided. Among the three roller members 21, 22, and 23, the roller member 22 drives the intermediate transfer belt 20. The roller member 23 opposes a second transfer roller 31 with the intermediate transfer belt 20 therebetween. The second transfer roller 31 and the roller member 23 form the second transfer device 30. A belt cleaner 24, which removes toner remaining on the intermediate transfer belt 20 which has not been transferred to a recording medium, is provided at a position at which the belt cleaner 24 opposes the roller member 21 with the intermediate transfer belt 20 therebetween.

A first transport path R1, a second transport path R2, and a third transport path R3 are provided in the printing apparatus 1. Sheets P pass through the first transport path R1 and are transported to the second transfer device 30. After passing through the second transfer device 30, the sheets P pass through the second transport path R2. The third transport path R3 branches off from the second transport path R2 on the farther downstream side than a fixing device 50 (discussed later) and extends to under the first transport path R1. The sheets P pass through the third transport path R3 and are transported back to the first transport path R1. Sheets that have been transported along the second transport path R2 and that are not guided to the third transport path R3 are discharged to outside the printing apparatus 1 and are stacked on a sheet stacking portion (not shown).

The printing apparatus 1 also includes a sheet transport unit 40 that transports sheets P along the first transport path R1, the second transport path R2, and the third transport path R3. The sheet transport unit 40 includes a first sheet supply device 40A and a second sheet supply device 40B. The first sheet supply device 40A supplies sheets P to the first transport path R1. The second sheet supply device 40B is disposed on the farther downstream side than the first sheet supply device 40A in the transport direction of sheets P, and supplies sheets P to the first transport path R1. The first and second sheet supply devices 40A and 40B have the same structure, and each include a sheet storage portion 41 in which sheets P are stored and an extracting roller 42 which extracts sheets P stored in the sheet storage portion 41 and which transports the extracted sheets P. In the first and second sheet supply devices 40A and 40B, different types, sizes, and orientations of sheets P may be stored.

The sheet transport unit 40 includes plural transport rollers 43 provided along the first, second, and third transport paths R1, R2, and R3. The plural transport rollers 43 sandwich sheets P therebetween and transport the sheets P. The sheet transport unit 40 also includes a belt transport unit 44 which is provided on the second transport path R2. The belt transport unit 44 transports sheets P passing through the second transfer device 30 to the fixing device 50.

The printing apparatus 1 also includes the fixing device 50 provided on the second transport path R2. The fixing device 50 fixes an image, which has been transferred onto a sheet P by the second transfer device 30, on the sheet P. The fixing device 50 includes a heating roller 50A which is heated by a built-in heater (not shown) and a pressing roller 50B which presses the heating roller 50A. In this fixing device 50, a sheet P passes between the heating roller 50A and the pressing roller 50B and is heated and pressed, thereby fixing the image on the sheet P.

In the following description, the above-described image forming units 10Y, 10M, 10C, and 10K, the intermediate transfer belt 20, the second transfer device 30, the sheet transport unit 40, and the fixing device 50 will be referred to as an "image forming unit 10". The image forming unit 10 of the first exemplary embodiment serves as an example of an image forming unit.

In the printing apparatus 1 of the first exemplary embodiment, an image may be printed on a first side of a sheet P supplied from, for example, the first sheet supply device 40A, and another image may also be printed on a second side of the sheet P. More specifically, in the printing apparatus 1, after an image is transferred onto the first side of the sheet P and passes through the fixing device 50, the front and back sides (first and second sides) of the sheet P are reversed while passing through the third transport path R3, and the sheet P is then supplied back to the second transfer device 30. Then, an image is transferred onto the second side of the sheet P in the second transfer device 30. Subsequently, the sheet P passes through the fixing device 50 again and the image transferred onto the sheet P is fixed on the sheet P. With this operation, an image may be formed on the first side of a sheet P, and another image may be formed on the second side of the sheet P.

In the printing apparatus 1, an image reader 70 is disposed on the second transport path R2 on the farther downstream side than the fixing device 50 in the transport direction of sheets P and on the farther upstream side than a portion at which the third transport path R3 branches off from the second transport path R2 in the transport direction of sheets P. The image reader 70, which serves as an example of an image reader, reads an image printed on a sheet P subjected to a second transfer operation and a fixing operation in the second transfer device 30 and the fixing device 50, respectively. The image reader 70 reads an image printed on the side of the sheet P which opposes the intermediate transfer belt 20, i.e., an image on the side of the sheet P subjected to a second transfer operation in the second transfer device 30. The image reader 70 includes three line sensors (not shown) which are disposed in a direction intersecting with the transport direction of sheets P and which read red (R), green (G), and blue (B) images. The line sensors read one side of the sheet P line by line. The image reader 70 is not restricted to line sensors, and may be another type of sensor, such as a two-dimensional area sensor that reads RGB color images.

Figure 3:
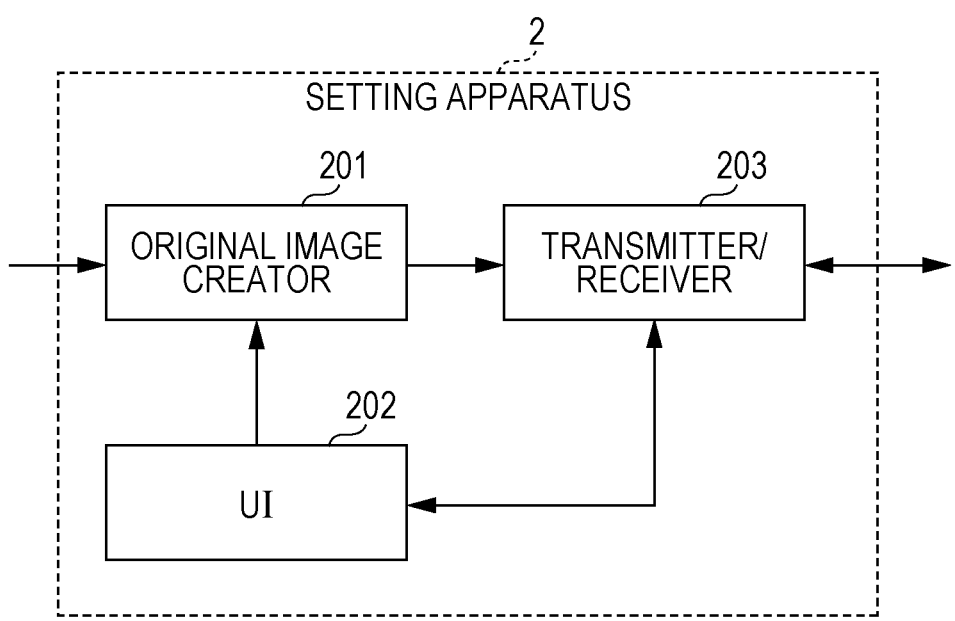
FIG. 3 is a block diagram illustrating the functional configuration of a setting apparatus.

FIG. 3 is a block diagram illustrating the functional configuration of the setting apparatus 2 shown in FIG. 1. The fixing apparatus 2 is constituted by a computer including a CPU, a ROM, a RAM, etc. The setting apparatus 2 is a so-called digital front end (DFE) that performs data processing on data, which is to be input into the printing apparatus 1, when executing a job of continuously printing images on one or plural sheets P in response to one instruction.

The setting apparatus 2 includes an original image creator 201, a user interface (UI) 202, and a transmitter/receiver 203.

On the basis of input image data input from an external source, the original image creator 201 creates "original image data" that is interpretable by the printing apparatus 1.

The UI 202 receives input of various settings which are necessary for performing printing by using the printing apparatus 1 on the basis of the original image data. Examples of the various settings received via the UI 202 are a setting for a color space used for defining the original image data, a setting for the resolution used for performing printing on the basis of the original image data, etc. However, there may be some cases where information concerning the color space and the resolution is already included in input image data. In the following description, the color space of original image data will be referred to as a "set color space", and the resolution of original image data will be referred to as a "set resolution". In this example, the set color space is defined in a CMYK color space. The UI 202 displays, on a display (not shown), images represented by data sent from the printing apparatus 1 or the inspection apparatus 3 via the network 4.

The transmitter/receiver 203 transmits and receives various items of data to and from the printing apparatus 1 or the inspection apparatus 3 shown in FIG. 1 via the network 4.

Figure 4:
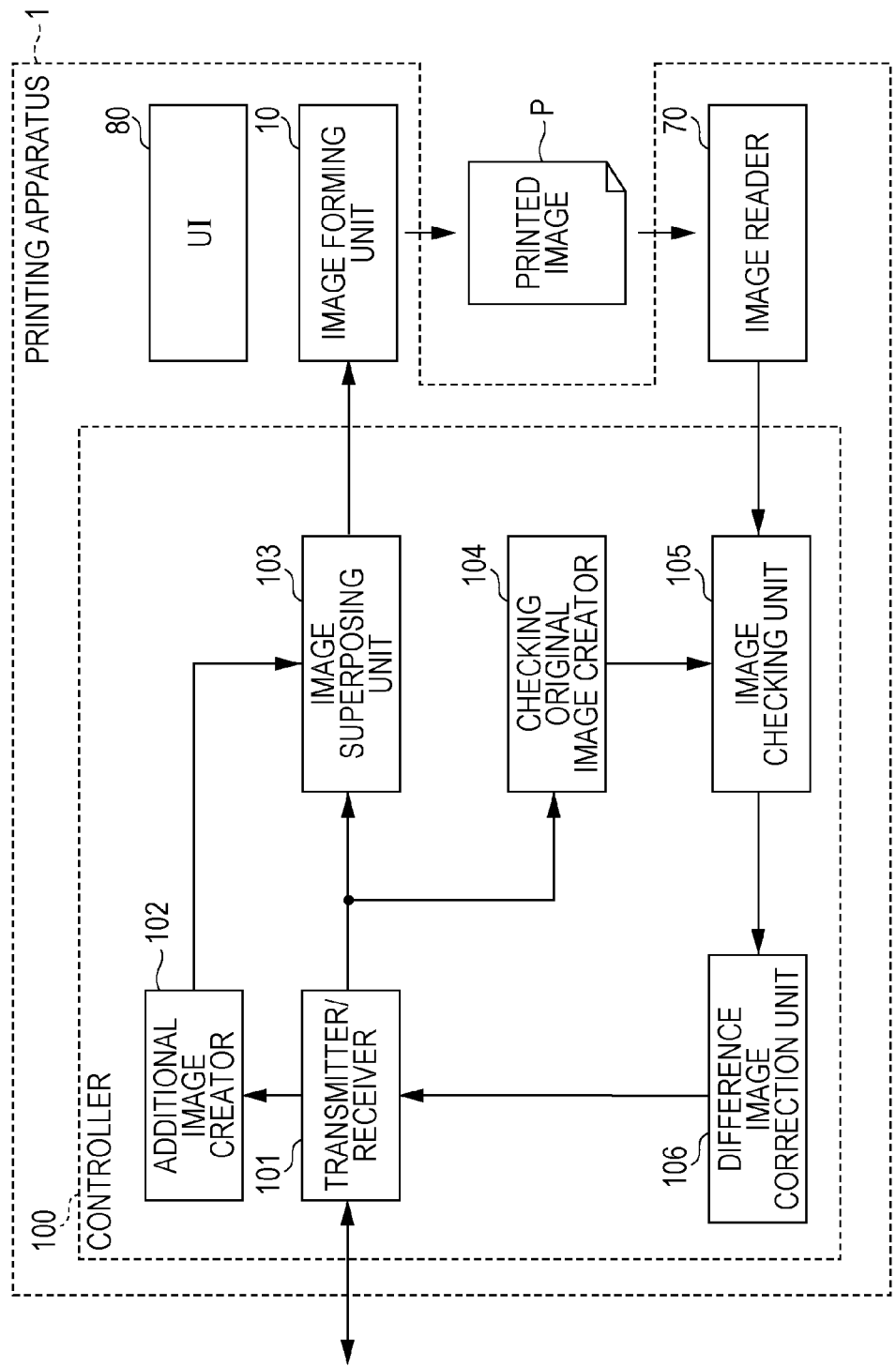
FIG. 4 is a block diagram illustrating the functional configuration of a printing apparatus according to a first exemplary embodiment.

FIG. 4 is a block diagram illustrating the functional configuration of the printing apparatus 1 of the first exemplary embodiment.

The printing apparatus 1 of the first exemplary embodiment includes the image forming unit 10 that forms an image on a sheet P, the image reader 70 that reads an image printed on a sheet P, a UI 80, and the controller 100. The UI 80 receives, from a user, instructions to perform or cancel image formation or instructions indicating whether to create an additional image (details of which will be given later). The controller 100 controls the image forming unit 10, the image reader 70, and the UI 80. The controller 100 includes a transmitter/receiver 101, an additional image creator 102, an image superposing unit 103, a checking original image creator 104, an image checking unit 105, and a difference image correction unit 106.

The transmitter/receiver 101 transmits and receives various items of data to and from the setting apparatus 2 or the inspection apparatus 3 shown in FIG. 1 via the network 4.

In response to original image data input from the setting apparatus 2 via the transmitter/receiver 101, the additional image creator 102 creates "additional image data" to be printed on a sheet P together with this original image data. When creating additional image data, the additional image creator 102 sets the color space of the additional image data to the above-described set color space, and sets the resolution of the additional image data to the above-described set resolution. Details of additional image data will be given later.

The image superposing unit 103 superposes (combines) each page of an image represented by additional image data created by the additional image creator 102 on (with) the associated page of an image represented by original image data input from the setting apparatus 2 via the transmitter/receiver 101, thereby creating "document image data". In the first exemplary embodiment, the color space of the document image data (called an "output color space") is the same as the set color space (CMYK color space). This is because the color materials used in the image forming unit 10 are four colors, i.e., CMYK colors. If the set color space which defines the original image data and the additional image data is different from the color materials used in the image forming unit 10, the image superposing unit 103 performs color conversion, when creating document image data, for converting the set color space into the output color space that matches the color materials of the image forming unit 10, at the same time as superposing additional image data on original image data. Additionally, when creating document image data from the original image data and the additional image data, the image superposing unit 103 directly uses the set resolution of the original image data and the additional image data as the "output resolution". However, the output resolution may be set to be different from the set resolution.

In the first exemplary embodiment, each of the additional image creator 102 and the image superposing unit 103 serves as an addition unit.

The image forming unit 10 prints an image (printed image) on a sheet P on the basis of the set color space and the set resolution by using the document image data created by the image superposing unit 103.

The image reader 70 reads an image printed on a sheet P by using the three line sensors. The image reader 70 then creates "read image data" on the basis of results obtained by reading the printed image by using the individual line sensors. When creating read image data from the reading results, the image reader 70 sets the color space of read image data to a color space corresponding to reading colors of the individual line sensors (called an "input color space"). In this example, the input color space is defined by the RGB color space corresponding to the colors (in this example, red, green, and blue) of the individual line sensors forming the image reader 70. When creating read image data from the reading results, the image reader 70 sets the resolution (input resolution) on the basis of the reading results. The input resolution is determined by the gap between which plural sensor elements forming each line sensor are arranged, the reading cycle of each line sensor, the transport speed of sheets P, etc. The input resolution may be the same value as the output resolution, or may be a value different from the output resolution.

The checking original image creator 104 creates "checking original image data", which serves as a basis used for performing checking by the image checking unit 105, on the basis of original image data input from the setting apparatus 2 via the transmitter/receiver 101. When creating checking original image data from original image data, the checking original image creator 104 converts the set color space of the original image data into a color space used for performing checking by the image checking unit 105 (called an "inspection color space"). In this example, the inspection color space is defined by the RGB color space, which is the same as the above-described input color space. When creating checking original image data from original image data, the checking original image creator 104 also converts, if necessary, the set resolution into a resolution used for performing checking by the image checking unit 105 (called an "inspection resolution"). The inspection resolution is determined on the basis of the relationship between the output resolution of the image forming unit 10 and the input resolution of the image reader 70. In this example, the inspection resolution is set to be the same value as the above-described input resolution.

The image checking unit 105, which is an example of a difference image creator, creates "difference image data" by checking the checking original image data created by the checking original image creator 104 against the read image data created by the image reader 70, the checking original image data and the read image data being created on the basis of the same original image data. In this example, difference image data is created by calculating the difference between the pixel value of each of pixels of an image represented by the checking original image data and the pixel value of the associated pixel of an image represented by the read image data. In this example, since the checking original image data and the read image data are defined in the inspection color space and have been created by using the inspection resolution, the difference image data is also defined in the inspection color space and is created by using the inspection resolution.

The difference image correction unit 106, which is an example of a canceling unit, creates "corrected difference image data" by performing the following correction on the difference image data input from the image checking unit 105. In this correction, the difference image correction unit 106 removes, from the difference image data, pixel components of an additional image represented by additional image data which is contained in the image printed on the sheet P as a result of adding the additional image data to the original image data. In this example, the difference image data is defined in the inspection color space and has been created by using the inspection resolution. Accordingly, the corrected difference image data is also defined in the inspection color space and is created by using the inspection resolution. The purpose of the inspection performed in the inspection apparatus 3 is to check whether an original image has been printed without any defect on the basis of original image data input from an external source. Accordingly, it is not necessary to check for defects of an additional image created by the printing apparatus 1. Thus, in the first exemplary embodiment, the corrected difference image data from which the additional image has been removed is sent to the inspection apparatus 3 via the transmitter/receiver 101, which is an example of an output unit.

Figure 5:
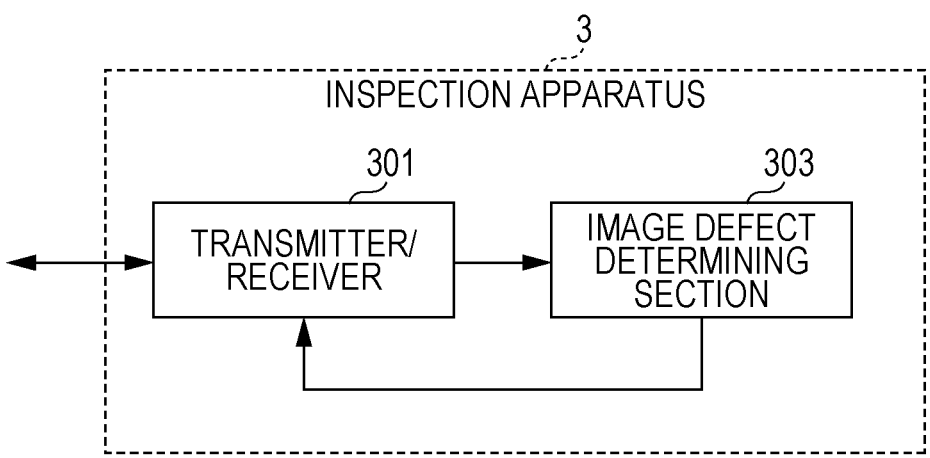
FIG. 5 is a block diagram illustrating the functional configuration of an inspection apparatus according to the first exemplary embodiment.

FIG. 5 is a block diagram illustrating the functional configuration of the inspection apparatus 3 shown in FIG. 1. The inspection apparatus 3 is constituted by a computer including a CPU, a ROM, a RAM, etc. The inspection apparatus 3 performs inspection to find defects of an image printed on a sheet P by using the printing apparatus 1.

The inspection apparatus 3 includes a transmitter/receiver 301 and an image defect determining section 303.

The transmitter/receiver 301 transmits and receives various items of data to and from the printing apparatus 1 or the setting apparatus 2 shown in FIG. 1 via the network 4.

The image defect determining section 303, which is an example of an inspection unit, checks for, on the basis of the corrected difference image data input from the printing apparatus 1 via the transmitter/receiver 301, defects of an image printed on a sheet P. The determination results obtained from the image defect determining section 303 are sent to the setting apparatus 2 via the transmitter/receiver 301.

A description will now be given of the relationship among original image data, additional image data, and document image data used in the printing apparatus 1 of the first exemplary embodiment.

Figure 6:
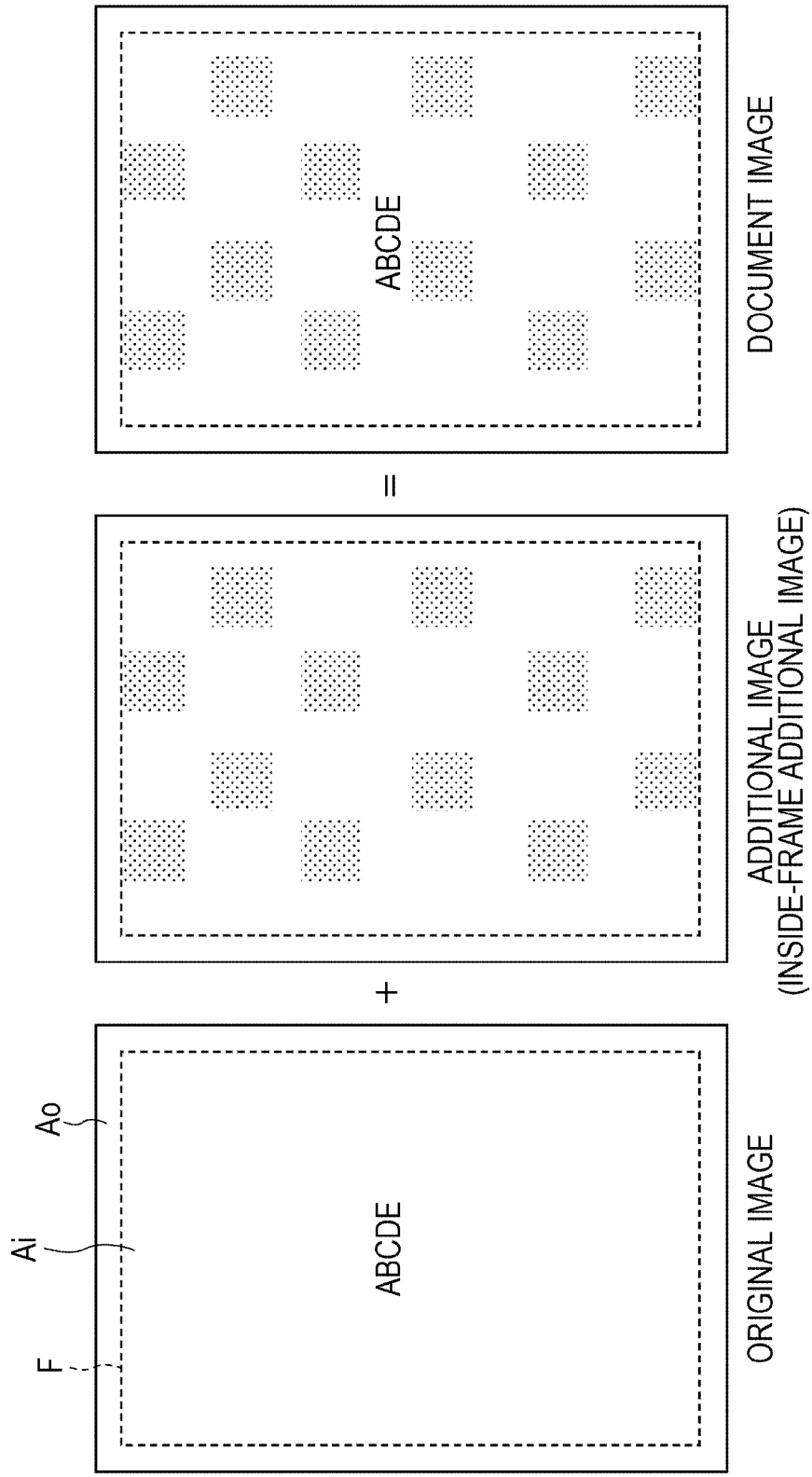
FIG. 6 is a conceptual diagram illustrating the relationship between an original image and an additional image (inside-frame additional image) and a document image.
Figure 7:
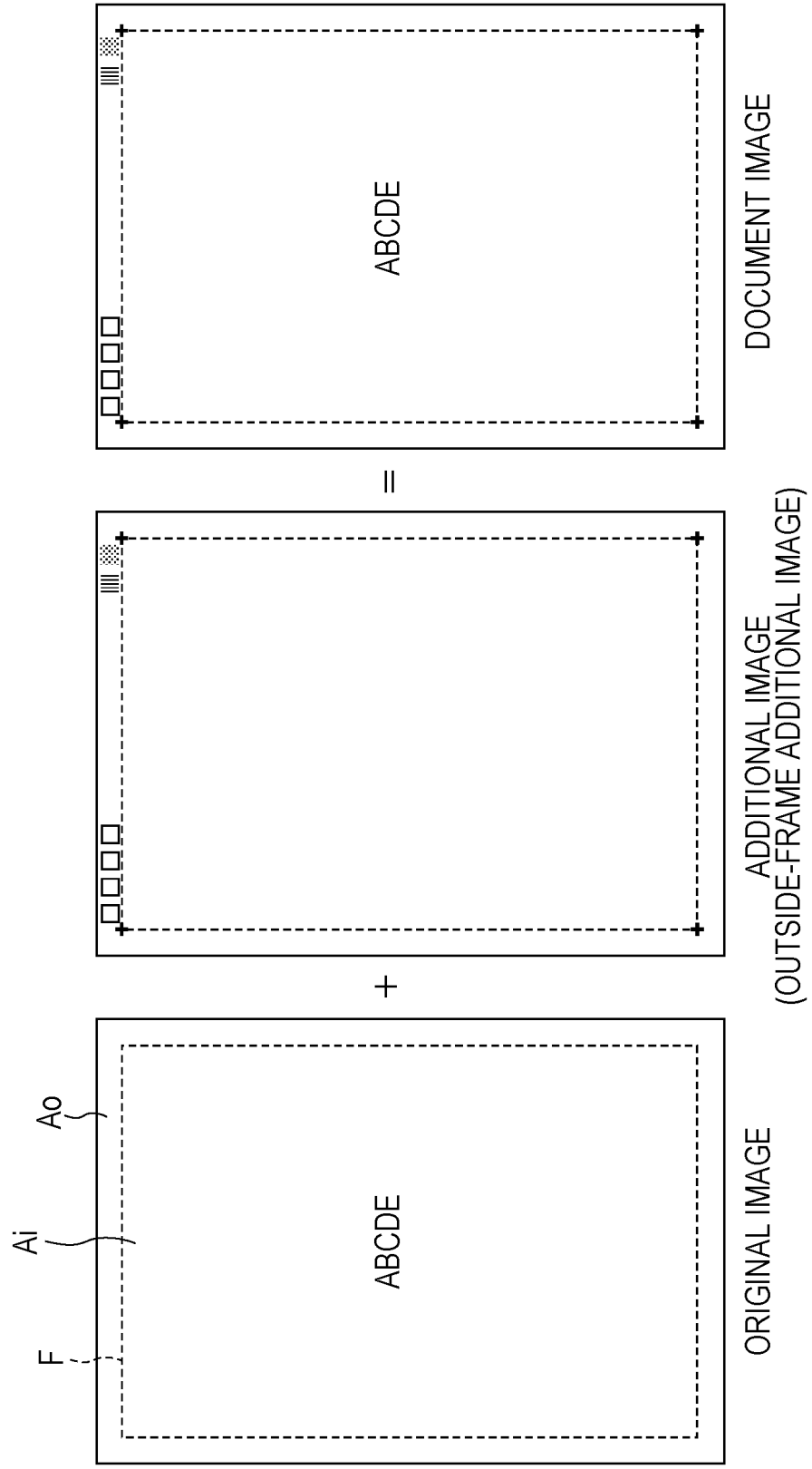
FIG. 7 is a conceptual diagram illustrating the relationship between an original image and another additional image (outside-frame additional image) and a document image.

FIGS. 6 and 7 are conceptual diagrams illustrating the relationship between an original image and an additional image, and a document image obtained by superposing the additional image on the original image. In FIG. 6, an inside-frame additional image (details of which will be given later) is added as an example of the additional image. In FIG. 7, an outside-frame additional image (details of which will be given later) is added as an example of the additional image.

Before discussing the correlation among an original image, an additional image, and a document image, a print area on a sheet P in which an image is printed will be described first with reference to FIGS. 6 and 7. In the printing apparatus 1 of the first exemplary embodiment, an image is printed on a sheet P by using the image forming unit 10, and in this case, an image represented by original image data is printed on a central region of a sheet P, except for the four-side edges on the sheet P. In the following description, the outer boundary of an area on a sheet P in which an image represented by original image data is printed will be referred to as a "set frame F" (indicated by the broken lines in FIGS. 6 and 7). On the sheet P, the inside of the set frame F, i.e., an area in which an image represented by original image data is printable will be referred to as an "inside-frame area Ai", and the outside of the set frame F, i.e., an area in which an image represented by original image data is not printable will be referred to as an "outside-frame area Ao". An original image is printed by using CMYK color materials, as stated above, however, in the examples shown in FIGS. 6 and 7, an original image (character image "ABODE") is printed by using a K color material.

In contrast, an image represented by additional image data may be printed both in the inside-frame area Ai and the outside-frame area Ao. Among additional images, an additional image to be printed in the inside-frame area Ai is an inside-frame additional image, as shown in FIG. 6, and an additional image to be printed in the outside-frame area Ao is an outside-frame additional image, as shown in FIG. 7.

Accordingly, in a document image obtained by superposing an additional image on an original image, the original image and an inside-frame additional image may be disposed in the inside-frame area Ai, and an outside-frame additional image may be disposed in the outside-frame area Ao.

The inside-frame additional image, which is an example of a first additional image, is constituted by, for example, a code image including code information for specifying the source of an obtained printed matter. The code image has a specific attribute so that it will be identifiable as a code image later after being read with a sensor. In the example shown in FIG. 6, the inside-frame additional image (code image) has an attribute in which the inside-frame additional image (code image) is printed periodically by using a Y color material.

The outside-frame additional image, which is an example of a second additional image, is constituted by, for example, a mark image, which is necessary for work conducted during the process of printing or book-binding. Mark images are disposed at specific positions outside a frame since they will be read with various sensors during a printing post-process. That is, the outside-frame additional image has an attribute in which it is printed at a specific position outside a frame. Examples of such mark images are registration marks, color bars, and color patches. Other examples of the mark images are Quick Response (QR) Code (trademark of DENSO WAVE INCORPORATED) and barcodes, which are used for management during the process of printing or book-binding. In the first exemplary embodiment, outside-frame additional images (mark images) are printed by using CMYK color materials.

In the first exemplary embodiment, the printed sheet P is cut off along the set frame F (or on the basis of corner registration marks printed at the four corners of the set frame F) after being subjected to various post-processes. As a result, the outside-frame area Ao is removed, leaving only the inside-frame area Ai on the sheet P.

Figure 8:
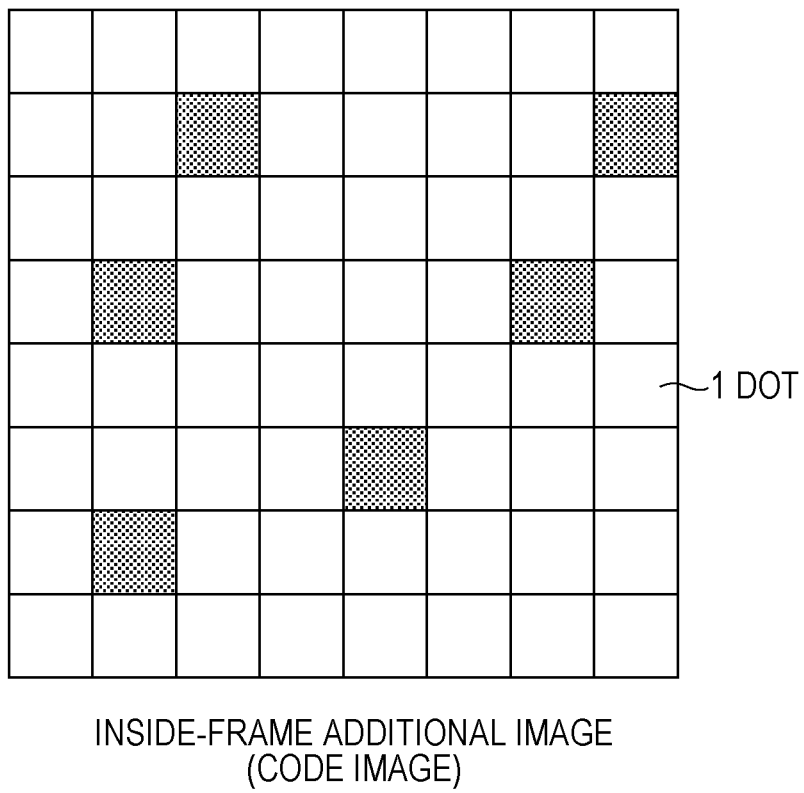
FIG. 8 illustrates an example of the configuration of an inside-frame additional image.

FIG. 8 illustrates an example of the configuration of the inside-frame additional image shown in FIG. 6.

In the first exemplary embodiment, the inside-frame additional image is constituted by code images for specifying the source of a printed matter, as stated above. In this example, the code images are constituted by dot images in which a Y color material, which is difficult to visually identify, is disposed in accordance with code information to be given. For example, if the output resolution of the image forming unit 10 is 600 dots per inch (dpi), each of the dot images forming the inside-frame additional image has a size equal to one dot. In this case, the size of each dot image is about 42.3 µm.

Figure 9:
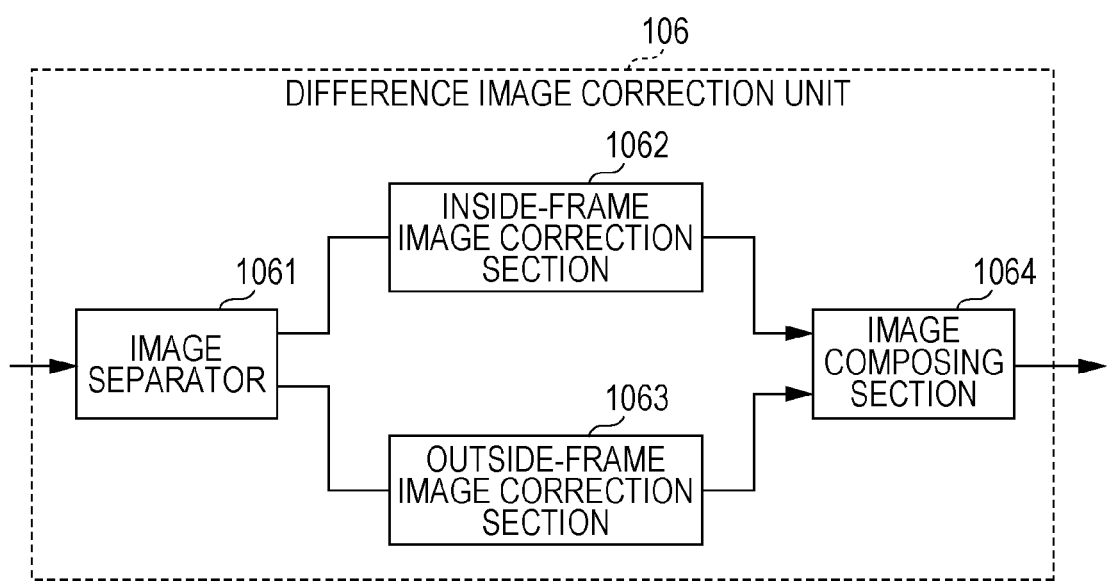
FIG. 9 is a block diagram illustrating the functional configuration of a difference image correction unit provided in a printing apparatus.

FIG. 9 is a block diagram illustrating the functional configuration of the difference image correction unit 106 provided in the printing apparatus 1 shown in FIG. 4.

The difference image correction unit 106 includes an image separator 1061, an inside-frame image correction section 1062, an outside-frame image correction section 1063, and an image composing section 1064.

The image separator 1061 divides difference image data input from the image checking unit 105 into inside-frame difference image data and outside-frame difference image data on the basis of information concerning the set frame F (see FIGS. 6 and 7) of original image data, which is the basis for the difference image data.

The inside-frame image correction section 1062 creates corrected inside-frame difference image data by performing the following correction on the inside-frame difference image data separated from the difference image data by using the image separator 1061. In this correction, the inside-frame image correction section 1062 removes, from the inside-frame difference image data, pixel components of an inside-frame additional image which is disposed in an image printed on the sheet P as a result of adding an additional image (inside-frame additional image) to an original image.

The outside-frame image correction section 1063 creates corrected outside-frame difference image data by performing the following correction on the outside-frame difference image data separated from the difference image data by using the image separator 1061. In this correction, the outside-frame image correction section 1063 removes, from the outside-frame difference image data, pixel components of an outside-frame additional image which is disposed in an image printed on the sheet P as a result of adding an additional image (outside-frame additional image) to an original image.

The image composing section 1064 combines the corrected inside-frame difference image data created by the inside-frame image correction section 1062 with the corrected outside-frame difference image data created by the outside-frame image correction section 1063, thereby creating corrected difference image data. The image composing section 1064 then outputs the corrected difference image data to the transmitter/receiver 101 (see FIG. 4).

In the first exemplary embodiment, the inside-frame image correction section 1062 and the outside-frame image correction section 1063 correct image data in different manners, which will be discussed later.

Figure 10:
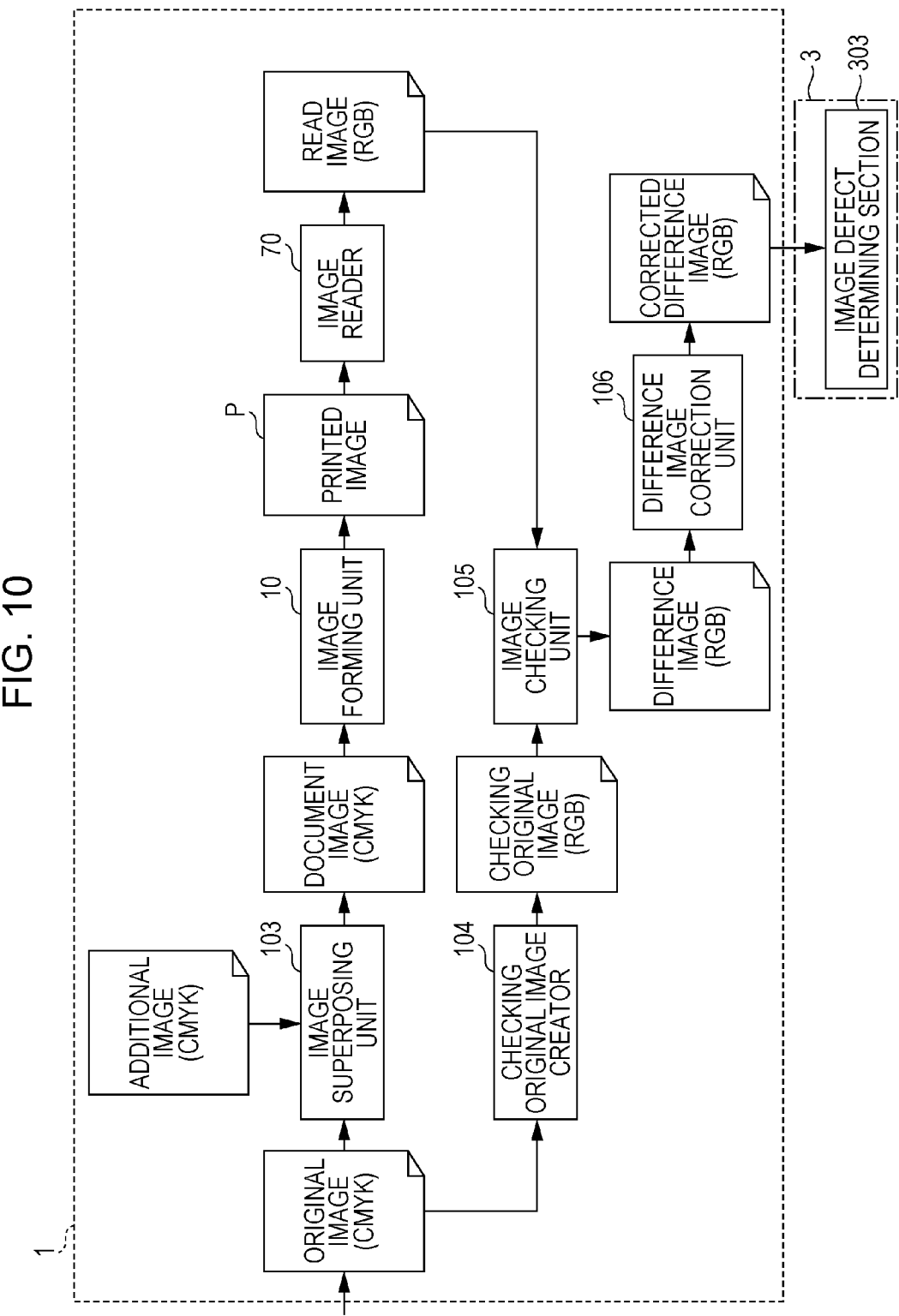
FIG. 10 illustrates a printing/inspecting procedure in a printing system of the first exemplary embodiment.

FIG. 10 illustrates a printing/inspecting procedure in the printing system of the first exemplary embodiment. A description will be given below, with reference to FIG. 10, of operations performed by the printing apparatus 1, the setting apparatus 2, and the inspection apparatus 3 of the printing system and data sent and received among these apparatuses.

Original image data (having a set color space (in this example, CMYK) and a set resolution) created in the setting apparatus 2 (not shown) is input into the image superposing unit 103 of the printing apparatus 1. The additional image creator 102 (not shown) creates additional image data (having a CMYK set color space and a set resolution) corresponding to the original image data, and outputs the created additional image data to the image superposing unit 103. Among items of additional image data, inside-frame additional image data is automatically created by the additional image creator 102 without receiving an instruction to create an inside-frame additional image from a user via the UI 180. In contrast, outside-frame additional image data is created by the additional image creator 102 by receiving an instruction from a user via the UI 180. The image superposing unit 103 superposes the received additional image data on the received original image data, thereby creating document image data (having an output color space (in this example, CMYK) and an output resolution). The same original image data (having a CMYK set color space and a set resolution) is also input into the checking original image creator 104 of the printing apparatus 1. The checking original image creator 104 then creates checking original image data (having an inspection color space (in this example, RGB) and an inspection resolution) on the basis of the received original image data.

In the printing apparatus 1, the document image data (having a CMYK output color space and an output resolution) created by the image superposing unit 103 is input into the image forming unit 10. The image forming unit 10 then prints an image including CMYK colors on a sheet P on the basis of the received document image data. Subsequently, the image reader 70 provided in the printing apparatus 1 reads the image printed on the sheet P. The image reader 70 then creates read image data (having an input color space (in this example, RGB) and an input resolution) on the basis of results obtained by reading the image by using the three line sensors.

In the printing apparatus 1, the read image data (an RGB input color space and an input resolution (in this example, input resolution is equal to inspection resolution)) and the checking original image data (an RGB inspection color space and an inspection resolution), which are obtained on the basis of the same original image data (having a CMYK set color space and a set resolution), are input into the image checking unit 105. The image checking unit 105 then calculates the difference between the pixel value of each of pixels of an image represented by the read image data and the pixel value of the associated pixel of an image represented by the checking original image data, the two pixels being located at the same position on two-dimensional coordinates, thereby creating difference image data representing a difference image (having an RGB inspection color space and an inspection resolution). The differences calculated by the image checking unit 105 are used as the pixel values of pixels forming the difference image.

Subsequently, in the printing apparatus 1, the difference image data is input into the difference image correction unit 106. The difference image correction unit 106 creates corrected difference image data (having an RGB inspection color space and an inspection resolution) by performing the following correction on the difference image data. In this correction, the difference image correction unit 106 removes, from the difference image data, pixel components of the additional image which is disposed in an image printed on the sheet P as a result of adding the additional image data to the original image data. A specific procedure of processing performed by the difference image correction unit 106 will be discussed later.

In the inspection apparatus 3, the corrected difference image data output from the difference image correction unit 106 of the printing apparatus 1 is input into the image defect determining section 303. The image defect determining section 303 then checks for image defects in the image printed on a sheet P on the basis of the corrected difference image data. The image defect determining section 303 may check for image defects in the following manner. If the pixel value of a pixel of the image represented by the corrected difference image data, i.e., the color difference, is greater than a predetermined reference value, the image defect determining section 303 determines that there is an image defect. If it is determined that there is an image defect, the determination results are sent to the setting apparatus 2. In the setting apparatus 2, an image indicating the occurrence of image defects is displayed on the UI 202 (see FIG. 3).

FIGS. 11A through 11H illustrate a procedure for creating corrected difference image data from read image data and checking original image data in the first exemplary embodiment. A description will be given below, assuming that a character image "ABCDE" shown in FIGS. 6 and 7 is used as an original image and that both of an inside-frame additional image (code images) shown in FIG. 6 and an outside-frame additional image (mark images) shown in FIG. 7 are used as additional images.

Figure 11:
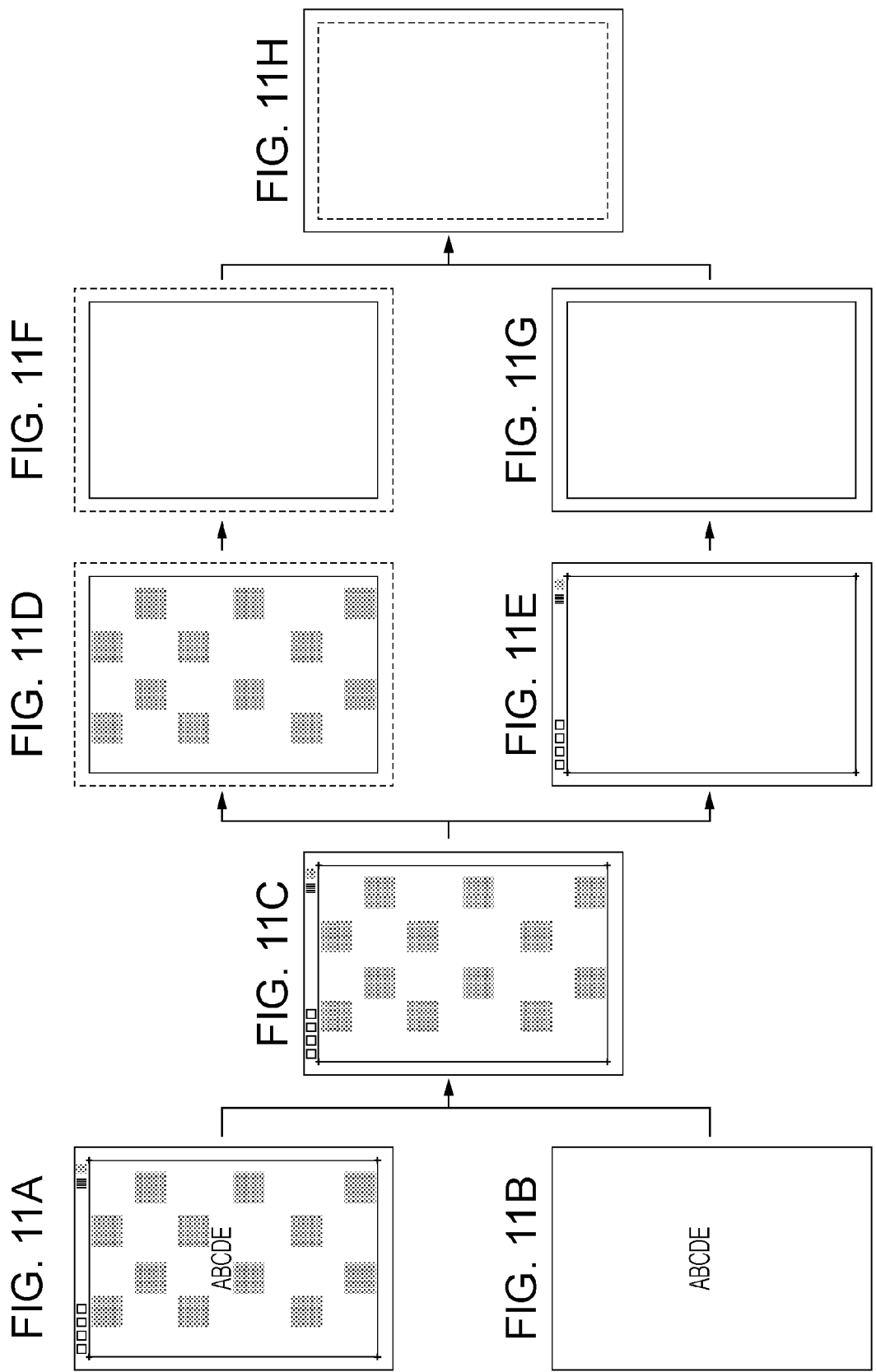
FIGS. 11A through 11H illustrate a procedure for creating corrected difference image data from read image data and checking original image data in the first exemplary embodiment.

FIG. 11A illustrates read image data obtained as a result of reading an image printed on a sheet P by using the image reader 70. FIG. 11B illustrates checking original image data obtained by the checking original image creator 104 on the basis of the same original image data used for creating the read image data. Among the two items of data, the checking original image data shown in FIG. 11B includes a character image "ABCDE" in the inside-frame area Ai. In contrast, the read image data shown in FIG. 11A includes, in the inside-frame area Ai, a character image "ABCDE" and an inside-frame additional image (code images shown in FIG. 6) represented by inside-frame additional image data, and also includes, in the outside-frame area Ao, an outside-frame additional image (mark images shown in FIG. 7).

FIG. 11C illustrates difference image data created by the image checking unit 105 on the basis of the read image data shown in FIG. 11A and the checking original image data shown in FIG. 11B. In this example, since the original image data (character image "ABCDE") is contained both in the read image data and the checking original image data, the pixel components of the image represented by the original image data are removed in the difference image data. In contrast, in this example, since additional images (inside-frame additional image and outside-frame additional image) are contained only in the read image data, the pixel components of the image represented by the additional image data remain in the difference image data.

FIG. 11D illustrates inside-frame difference image data obtained as a result of separating the inside-frame image data from the difference image data shown in FIG. 11C by using the image separator 1061 of the difference image correction unit 106 shown in FIG. 9. FIG. 11E illustrates outside-frame difference image data obtained as a result of separating the outside-frame image data from the difference image data shown in FIG. 11C by using the image separator 1061 of the difference image correction unit 106 shown in FIG. 9. In this case, the inside-frame difference image data shown in FIG. 11D corresponds to only the inside-frame area Ai, and the inside-frame additional image (code images shown in FIG. 6) is disposed in the inside-frame area Ai as the difference. The outside-frame difference image data shown in FIG. 11E corresponds to only the outside-frame area Ao, and the outside-frame additional image (mark images shown in FIG. 7) is disposed in the outside-frame area Ao as the difference.

FIG. 11F illustrates corrected inside-frame difference image data obtained as a result of correcting the inside-frame difference image data shown in FIG. 11D by using the inside-frame image correction section 1062 of the difference image correction unit 106 shown in FIG. 9. In this example, as stated above, the inside-frame additional image disposed in the inside-frame area Ai is constituted by Y dot images (the outer diameter of each dot is about 42.3 μm). Accordingly, the inside-frame image correction section 1062 creates corrected inside-frame difference image data by performing smoothing filter processing, which makes it possible to substantially erase Y dot images having this size, on the inside-frame difference image data. More specifically, in this example, among RGB data items forming the inside-frame difference image data, smoothing filter processing is not performed on R and G data items, but is performed only on the B data item corresponding to Y. However, the corrected inside-frame difference image data may be created in a different manner. For example, the resolution (in this case, the inspection resolution) of the inside-frame difference image data may be converted into a lower resolution level, thereby substantially erasing the inside-frame additional image, i.e., the Y dot images, in the corrected inside-frame difference image data. Alternatively, if the pixel value (brightness or chroma) of a pixel in the inside-frame difference image data is smaller than a predetermined set value, such a pixel value may be changed into 0, thereby substantially erasing the inside-frame additional image, i.e., the Y dot images, in the corrected inside-frame difference image data. The inside-frame additional image may be erased in the above-described manner because it is constituted by a Y color material, which has only a small color difference from a background white color.

FIG. 11G illustrates corrected outside-frame difference image data obtained as a result of correcting the outside-frame difference image data shown in FIG. 11E by using the outside-frame image correction section 1063 of the difference image correction unit 106 shown in FIG. 9. The outside-frame additional image disposed in the outside-frame area Ao is positioned outside the inside-frame area Ai in which the original image is disposed, and is to be cut off and removed after being printed on a sheet P. Accordingly, the outside-frame image correction section 1063 performs substitute processing for uniformly replacing the pixel values of all the pixels of the image represented by the outside-frame difference image data with 0, thereby creating the corrected outside-frame difference image data.

FIG. 11H illustrates corrected difference image data obtained as a result of composing the corrected inside-frame difference image data shown in FIG. 11F with the corrected outside-frame difference image data shown in FIG. 11G by using the image composing section 1064 of the difference image correction unit 106 shown in FIG. 9. In this example, the difference between the original image and the additional image generated due to the presence of the additional image has been removed from each of the corrected inside-frame difference image data and the corrected outside-frame difference image data. Accordingly, the pixel values of all the pixels of the image represented by the corrected difference image data are 0. However, if there is any difference, in the inside-frame area Ai, which has not been generated due to the presence of an additional image and which has not been erased in the difference image correction unit 106, i.e., if there is any image, other than an original image and an additional image, which is not possible to erase in the difference image correction unit 106 (e.g., stain), or if there is no image corresponding to an original image in a printed image, the pixel value of a pixel located at a position corresponding to the presence of such a difference is a value other than 0.

In the above-described example, in the difference image correction unit 106, after the difference image data is divided into inside-frame difference image data and outside-frame difference image data, each of the inside-frame difference image data and the outside-frame difference image data is corrected. Then, the obtained corrected inside-frame difference image data and corrected outside-frame difference image data are combined, thereby obtaining corrected difference image data. However, the outside-frame additional image is substantially unnecessary for checking for image defects. Accordingly, after dividing the difference image data into inside-frame difference image data and outside-frame difference image data in the difference image correction unit 106, only the inside-frame difference image data may be corrected, and the obtained corrected inside-frame difference image data may be output to the inspection apparatus 3 as the corrected difference image data.

Second Exemplary Embodiment

In the first exemplary embodiment, the printing apparatus 1 creates image data (corrected difference image data) by calculating the difference between two items of image data obtained before and after performing a printing operation, and then, the inspection apparatus 3 checks for image defects on the basis of the corrected difference image data. In contrast, in a second exemplary embodiment, the printing apparatus 1 creates two items of image data obtained before and after performing a printing operation. Then, the inspection apparatus 3 creates image data (difference image data) by calculating the difference between the two items of image data created in the printing apparatus 1, and checks for image defects on the basis of the difference image data. In the second exemplary embodiment, elements similar to those of the first exemplary embodiment are designated by like reference numerals, and a detailed explanation thereof will thus be omitted.

Figure 12:
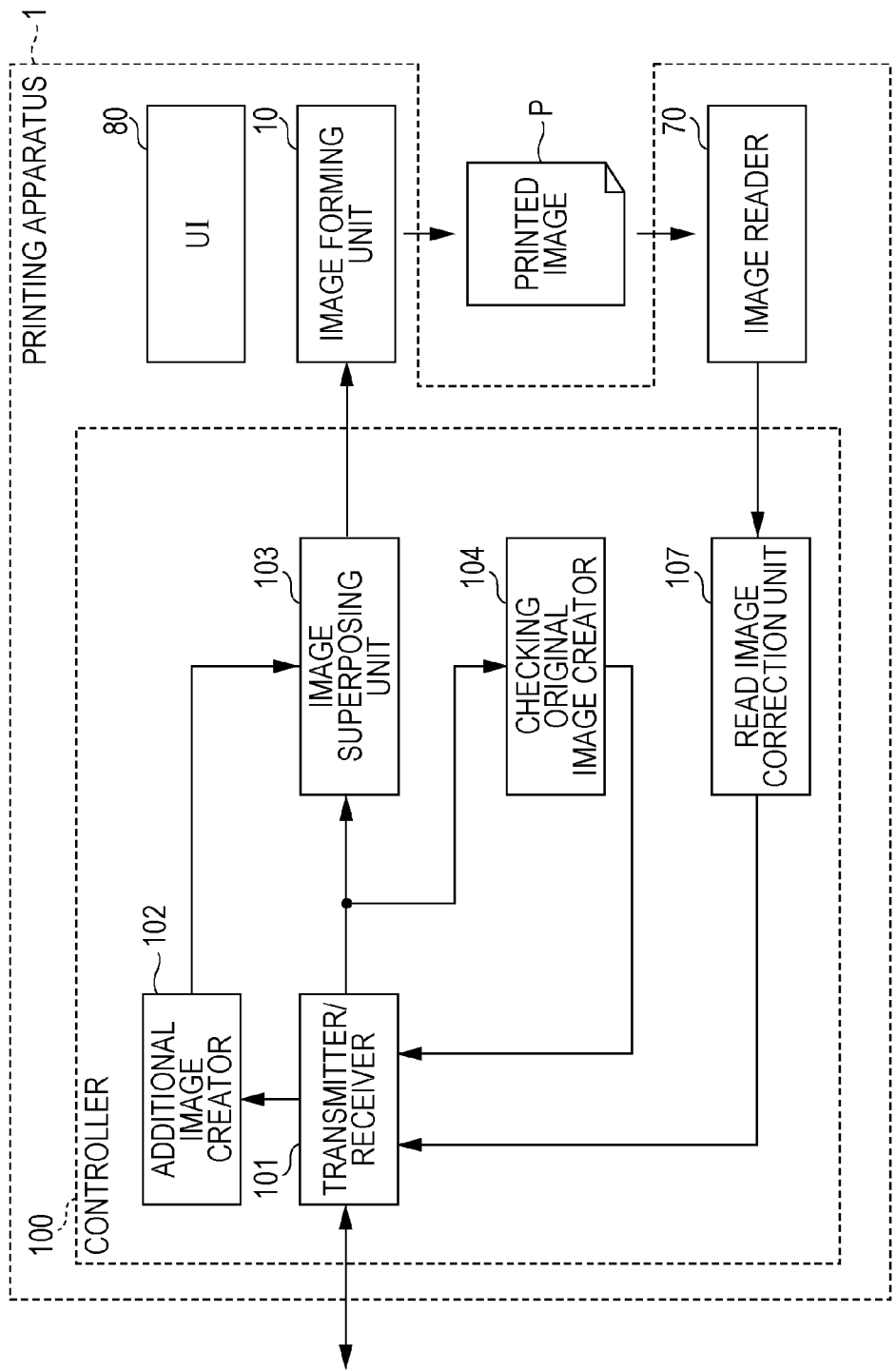
FIG. 12 is a block diagram illustrating the functional configuration of a printing apparatus according to a second exemplary embodiment.

FIG. 12 is a block diagram illustrating the functional configuration of the printing apparatus 1 of the second exemplary embodiment.

The printing apparatus 1 of the second exemplary embodiment includes the image forming unit 10 that forms an image on a sheet P, the image reader 70 that reads an image printed on a sheet P, the UI 80, and the controller 100. The UI 80 receives, from a user, instructions to perform or cancel image formation or instructions indicating whether to create an additional image (details of which will be given later). The controller 100 controls the image forming unit 10, the image reader 70, and the UI 80. The controller 100 includes the transmitter/receiver 101, the additional image creator 102, the image superposing unit 103, the checking original image creator 104, and a read image correction unit 107. That is, the controller 100 of the second exemplary embodiment differs from that of the first exemplary embodiment in that the read image correction unit 107 is provided instead of the image checking unit 105 and the difference image correction unit 106. The functions of the additional image creator 102, the image superposing unit 103, and the checking original image creator 104 are the same as those of the first exemplary embodiment.

The read image correction unit 107, which is an example of a canceling unit, creates "corrected read image data" by performing the following correction on read image data input from the image reader 70. In this correction, the read image correction unit 107 removes, from the read image data, pixel components of an additional image represented by additional image data which is disposed in an image printed on the sheet P as a result of adding the additional image data to the original image data. In this example, the read image data is defined in the input color space and has been created by using the input resolution. Accordingly, the corrected read image data is also defined in the input color space and is created by using the input resolution. The functions of the read image correction unit 107 of the second exemplary embodiment are the same as those of the difference image correction unit 106 provided in the printing apparatus 1 of the first exemplary embodiment. Accordingly, the read image correction unit 107 will be discussed below with reference to FIG. 9, assuming that the difference image correction unit 106 is replaced by the read image correction unit 107. That is, the read image correction unit 107 includes the image separator 1061, the inside-frame image correction section 1062, the outside-frame image correction section 1063, and the image composing section 1064.

In the second exemplary embodiment, the checking original image data created by the checking original image creator 104 and the corrected read image data created by the read image correction unit 107, the two items of data being created on the basis of the same original image data, are sent to the inspection apparatus 3 via the transmitter/receiver 101.

Figure 13:
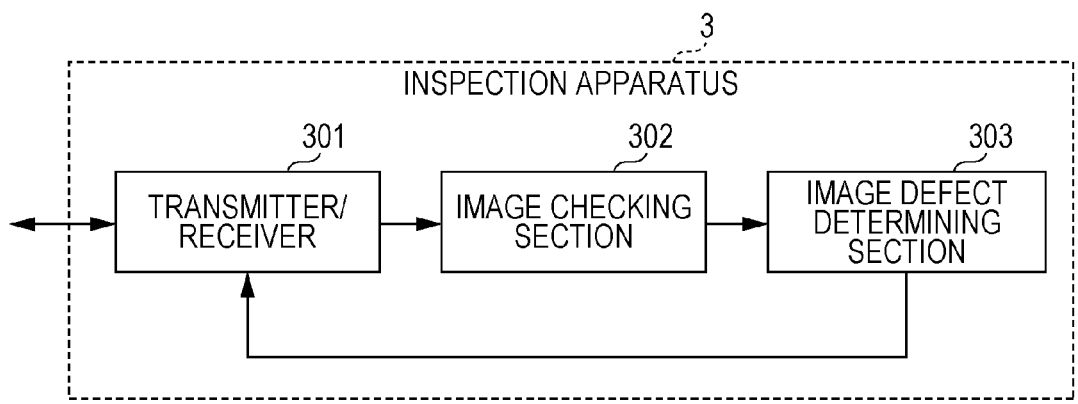
FIG. 13 is a block diagram illustrating the functional configuration of an inspection apparatus according to the second exemplary embodiment.

FIG. 13 is a block diagram illustrating the functional configuration of the inspection apparatus 3 of the second exemplary embodiment.

The inspection apparatus 3 includes the transmitter/receiver 301, an image checking section 302, and the image defect determining section 303. That is, the inspection apparatus 3 of the second exemplary embodiment differs from that of the first exemplary embodiment in that the image checking section 302 is also provided. The functions of the image checking section 302, which is an example of a difference image creator, provided in the inspection apparatus 3 is the same as those of the image checking unit 105 provided in the printing apparatus 1 of the first exemplary embodiment.

Figure 14:
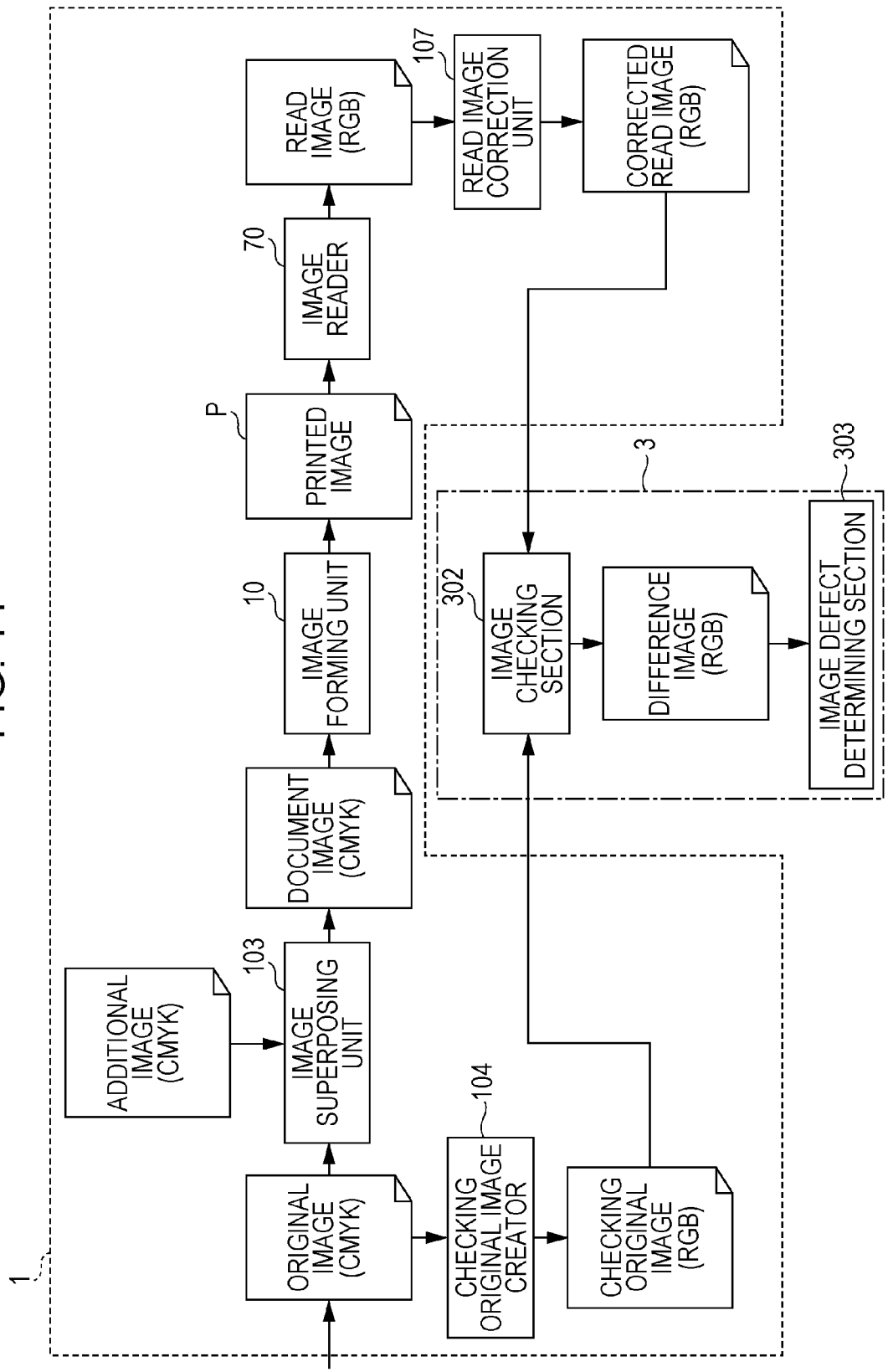
FIG. 14 illustrates a printing/inspecting procedure in a printing system of the second exemplary embodiment.

FIG. 14 illustrates a printing/inspecting procedure in the printing system of the second exemplary embodiment. A description will be given below, with reference to FIG. 14, of operations performed by the printing apparatus 1, the setting apparatus 2, and the inspection apparatus 3 of the printing system and data sent and received among these apparatuses.

Original image data (having a set color space (in this example, CMYK) and a set resolution) created in the setting apparatus 2 (not shown) is input into the image superposing unit 103 of the printing apparatus 1. The additional image creator 102 (not shown) creates additional image data (having a CMYK set color space and a set resolution) corresponding to the original image data, and outputs the created additional image data to the image superposing unit 103. The image superposing unit 103 superposes the received additional image data on the received original image data, thereby creating document image data (having an output color space (in this example, CMYK) and an output resolution). The same original image data (having a CMYK set color space and a set resolution) is also input into the checking original image creator 104 of the printing apparatus 1. The checking original image creator 104 then creates checking original image data (having an inspection color space (in this example, RGB) and an inspection resolution) on the basis of the received original image data.

In the printing apparatus 1, the document image data (having a CMYK output color space and an output resolution) created by the image superposing unit 103 is input into the image forming unit 10. The image forming unit 10 then prints an image including CMYK colors on a sheet P on the basis of the received document image data. Subsequently, the image reader 70 provided in the printing apparatus 1 reads the image printed on the sheet P. The image reader 70 then creates read image data (having an input color space (in this example, RGB) and an input resolution) on the basis of results obtained by reading the image by using the three line sensors.

In the printing apparatus 1, the read image data (an RGB input color space and an input resolution) is input into the read image correction unit 107. The read image correction unit 107 then creates corrected read image data (having an RGB inspection color space and an inspection resolution) by performing the following correction on the read image data. In this correction, the read image correction unit 107 removes, from the read image data, pixel components of the additional image which is disposed in an image printed on the sheet P as a result of adding the additional image data to the original image data. A specific procedure of processing performed by the read image correction unit 107 will be discussed later.

The checking original image data (having an RGB inspection color space and an inspection resolution) and the corrected read image data (having an RGB inspection color space and an inspection resolution), which are obtained on the basis of the same original image data, are output from the printing apparatus 1 to the inspection apparatus 103.

In the inspection apparatus 3, the checking original image data and the corrected read image data output from the printing apparatus 1 are input into the image checking section 302. The image checking section 302 then calculates the difference between the pixel value of each of pixels of an image represented by the checking original image data and the pixel value of the associated pixel of an image represented by the corrected read image data, the two pixels being located at the same position on two-dimensional coordinates, thereby creating difference image data representing a difference image (having an RGB inspection color space and an inspection resolution). The differences calculated by the image checking section 302 are used as the pixel values of pixels forming the difference image represented by the difference image data.

In the inspection apparatus 3, the difference image data created by the image checking section 302 is input into the image defect determining section 303. The image defect determining section 303 then checks for image defects in an image printed on a sheet P on the basis of the difference image data. If it is determined that there is an image defect, the determination results are sent to the setting apparatus 2. In the setting apparatus 2, an image indicating the occurrence of image defects is displayed on the UI 202 (see FIG. 3).

FIGS. 15A through 15H illustrate a procedure for creating difference image data from read image data and checking original image data in the second exemplary embodiment. A description will be given below, as in the first exemplary embodiment, assuming that a character image "ABCDE" shown in FIGS. 6 and 7 is used as an original image and that both of an inside-frame additional image (code images) shown in FIG. 6 and an outside-frame additional image (mark images) shown in FIG. 7 are used as additional images.

FIG. 15A illustrates read image data obtained as a result of reading an image printed on a sheet P by using the image reader 70. The read image data shown in FIG. 15A includes, in the inside-frame area Ai, a character image "ABCDE" and an inside-frame additional image (code images shown in FIG. 6) represented by inside-frame additional image data, and also includes, in the outside-frame area Ao, an outside-frame additional image (mark images shown in FIG. 7).

FIG. 15B illustrates inside-frame read image data obtained as a result of separating the inside-frame read image data from the read image data shown in FIG. 15A by using the image separator 1061 of the read image correction unit 107. FIG. 15C illustrates outside-frame read image data obtained as a result of separating the outside-frame read image data from the read image data shown in FIG. 15A by using the image separator 1061 of the read image correction unit 107. In this case, the inside-frame read image data shown in FIG. 15B corresponds to only the inside-frame area Ai, and the character image and the inside-frame additional image (code images shown in FIG. 6) contained in the original image are disposed in the inside-frame area Ai. In contrast, the outside-frame read image data shown in FIG. 15C corresponds to only the outside-frame area Ao, and the outside-frame additional image (mark images shown in FIG. 7) are disposed in the outside-frame area Ao.

FIG. 15D illustrates corrected inside-frame read image data obtained as a result of correcting the inside-frame read image data shown in FIG. 15B by using the inside-frame image correction section 1062 of the read image correction unit 107. In this example, the same processing as that performed on the inside-frame difference image data in the first exemplary embodiment is performed on the inside-frame read image data, thereby creating corrected inside-frame read image data. In this case, although the pixel components of the additional image (inside-frame additional image) disposed in the inside-frame area Ai are substantially erased, the pixel components of the original image (character image "ABCDE") disposed in the same inside-frame area Ai are not erased and remain the same.

FIG. 15E illustrates corrected outside-frame read image data obtained as a result of correcting the outside-frame read image data shown in FIG. 15C by using the outside-frame image correction section 1063 of the read image correction unit 107. In this example, the same processing as that performed on the outside-frame difference image data in the first exemplary embodiment is performed on the outside-frame read image data, thereby creating corrected outside-frame read image data. In this case, the pixel components of the additional image (outside-frame additional image) disposed in the outside-frame area Ao are completely erased.

FIG. 15F illustrates corrected read image data obtained as a result of composing the corrected inside-frame read image data shown in FIG. 15D with the corrected outside-frame read image data shown in FIG. 15E by using the image composing section 1064 of the read image correction unit 107. In this example, in each of the corrected inside-frame read image data and the corrected outside-frame read image data, the difference between the original image and the additional image generated due to the presence of the additional image has been removed. Accordingly, the pixel values of all the pixels of the image represented by the corrected read image data are 0, except for the pixels included in the character image represented by the original image data. However, if there is any difference, in the inside-frame area Ai, which has not been generated due to the presence of an additional image, i.e., if there is any image (stain) other than an original image and an additional image, or if there is no image corresponding to an original image in a printed image, the pixel value of a pixel located at a position corresponding to the presence of such a difference is a value other than 0.

FIG. 15G illustrates checking original image data obtained by the checking original image creator 104 on the basis of the same original image data as that used for creating the read image data. The checking original image data includes a character image "ABCDE" in the inside-frame area Ai.

FIG. 15H illustrates difference image data created by the image checking section 302 on the basis of the corrected read image data shown in FIG. 15F and the checking original image data shown in FIG. 15G. In this example, since the original image "ABCDE" is contained in each of the corrected read image data and the checking original image data, the pixel components of the original image are eliminated in the difference image data. Additionally, in this example, since the pixel components of the additional image have already been erased from the corrected read image data, the difference image data does not contain the pixel components of the additional image. However, if an image generated due to the presence of stain is added or an original image is missing, the pixel value of a pixel located at a position corresponding to the presence of such a difference is a value other than 0.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
an addition unit that creates additional image data having a specific attribute, to be added to original image data input from an external source, and that adds the additional image data to the original image data so as to create document image data;
an image forming unit that forms, on a recording medium, on the basis of the document image data, a document image including an original image associated with the original image data and an additional image associated with the additional image data;
an image reader that reads the document image formed on the recording medium by the image forming unit so as to create read image data;
a difference image creator that creates difference image data by calculating a difference between the original image data and the read image data;
a canceling unit that corrects, on the basis of the specific attribute of the additional image data, the difference image data by canceling a difference generated due to the addition of the additional image data so as to create corrected difference image data; and
an inspection unit that performs inspection to find a defect of the original image included in the document image formed on the recording medium by the image forming unit, on the basis of the corrected difference image data,
wherein:
the additional image data is distributed periodically in an inside-frame area, and the specific attribute of the additional image data indicates that the additional image associated with the additional image data is constituted by dots having an identical, specific color, and
the canceling unit corrects the difference image data by performing processing for reducing pixel values of pixels corresponding to the dots having the identical, specific color, among pixels included in the inside-frame area.

2. The printing system according to claim 1, wherein the image forming unit forms the original image associated with the original image data being formed in the inside-frame area.

3. The printing system according to claim 1, wherein:
the specific color is yellow;
the image forming unit forms an image on the recording medium by using cyan, magenta, yellow, and black color materials;
the image reader reads the image formed on the recording medium with red, green, and blue; and
the canceling unit corrects the difference image data by performing processing for canceling data concerning blue included in the difference image data.

4. The printing system according to claim 2, wherein:
the specific color is yellow;
the image forming unit forms an image on the recording medium by using cyan, magenta, yellow, and black color materials;
the image reader reads the image formed on the recording medium with red, green, and blue; and
the canceling unit corrects the difference image data by performing processing for canceling data concerning blue included in the difference image data.

5. A printing system comprising:
an addition unit that creates additional image data having a specific attribute, to be added to original image data input from an external source, and that adds the additional image data to the original image data so as to create document image data;
an image forming unit that forms, on a recording medium, on the basis of the document image data, a document image including an original image associated with the original image data and an additional image associated with the additional image data;
an image reader that reads the document image formed on the recording medium by the image forming unit so as to create read image data;
a difference image creator that creates difference image data by calculating a difference between the original image data and the read image data;
a canceling unit that corrects, on the basis of the specific attribute of the additional image data, the difference image data by canceling a difference generated due to the addition of the additional image data so as to create corrected difference image data; and
an inspection unit that performs inspection to find a defect of the original image included in the document image formed on the recording medium by the image forming unit, on the basis of the corrected difference image data,
wherein the image forming unit forms the original image associated with the original image data being formed in the inside-frame area, and
wherein:
the addition unit adds first additional image data having a first attribute and second additional image data having a second attribute to the original image data;
the image forming unit forms, in the inside-frame area, a first additional image associated with the first additional image data included in the document image data, and forms, in an outside-frame area, a second additional image associated with the second additional image data included in the document image data, the original image associated with the original image data not being formed in the outside-frame area; and
the canceling unit corrects the difference image data by performing processing for reducing pixel values of pixels of the first additional image associated with the first additional image data included in the inside-frame area, and by performing processing for uniformly reducing pixel values of all pixels included in the outside-frame area.

6. A printing system comprising:
an addition unit that creates additional image data having a specific attribute, to be added to original image data input from an external source, and that adds the additional image data to the original image data so as to create document image data;
an image forming unit that forms, on a recording medium, on the basis of the document image data, a document image including an original image associated with the original image data and an additional image associated with the additional image data;

an image reader that reads the document image formed on the recording medium by the image forming unit so as to create read image data;

a canceling unit that corrects, on the basis of the specific attribute of the additional image data, the read image data by canceling a difference generated due to the addition of the additional image data so as to create corrected read image data;

a difference image creator that creates difference image data by calculating a difference between the original image data and the corrected read image data; and an inspection unit that performs inspection to find a defect of the original image included in the document image formed on the recording medium by the image forming unit, on the basis of the corrected difference image data, wherein:
the additional image data is distributed periodically in an inside-frame area, and the specific attribute of the additional image data indicates that the additional image associated with the additional image data is constituted by dots having an identical, specific color, and the canceling unit corrects the read image data by performing processing for reducing pixel values of pixels corresponding to the dots having the identical, specific color, among pixels included in the inside-frame area.

7. The printing system according to claim 6, wherein the image forming unit forms the original image associated with the original image data being formed in the inside-frame area.

8. The printing system according to claim 6, wherein:
the specific color is yellow;
the image forming unit forms an image on the recording medium by using cyan, magenta, yellow, and black color materials;
the image reader reads the image formed on the recording medium with red, green, and blue; and
the canceling unit corrects the read image data by performing processing for canceling data concerning blue included in the read image data.

9. The printing system according to claim 7, wherein:
the specific color is yellow;
the image forming unit forms an image on the recording medium by using cyan, magenta, yellow, and black color materials;
the image reader reads the image formed on the recording medium with red, green, and blue; and
the canceling unit corrects the read image data by performing processing for canceling data concerning blue included in the read image data.

10. A printing system comprising:
an addition unit that creates additional image data having a specific attribute, to be added to original image data input from an external source, and that adds the additional image data to the original image data so as to create document image data;

an image forming unit that forms, on a recording medium, on the basis of the document image data, a document image including an original image associated with the original image data and an additional image associated with the additional image data;

an image reader that reads the document image formed on the recording medium by the image forming unit so as to create read image data;

a canceling unit that corrects, on the basis of the specific attribute of the additional image data, the read image data by canceling a difference generated due to the addition of the additional image data so as to create corrected read image data;

a difference image creator that creates difference image data by calculating a difference between the original image data and the corrected read image data; and an inspection unit that performs inspection to find a defect of the original image included in the document image formed on the recording medium by the image forming unit, on the basis of the corrected difference image data, wherein the image forming unit forms the original image associated with the original image data being formed in the inside-frame area, and wherein:
the addition unit adds first additional image data having a first attribute and second additional image data having a second attribute to the original image data;

the image forming unit forms, in the inside-frame area, a first additional image associated with the first additional image data included in the document image data, and forms, in an outside-frame area, a second additional image associated with the second additional image data included in the document image data, the original image associated with the original image data not being formed in the outside-frame area; and the canceling unit corrects the read image data by performing processing for reducing pixel values of pixels of the first additional image associated with the first additional image data included in the inside-frame area, and by performing processing for uniformly reducing pixel values of all pixels included in the outside-frame area.

11. An image forming apparatus comprising:
an addition unit that creates additional image data having a specific attribute, to be added to original image data input from an external source, and that adds the additional image data to the original image data so as to create document image data;

an image forming unit that forms, on a recording medium, on the basis of the document image data, a document image including an original image associated with the original image data and an additional image associated with the additional image data;

an image reader that reads the document image formed on the recording medium by the image forming unit so as to create read image data;

a difference image creator that creates difference image data by calculating a difference between the original image data and the read image data;

a canceling unit that corrects, on the basis of the specific attribute of the additional image data, the difference image data by canceling a difference generated due to the addition of the additional image data so as to create corrected difference image data; and an output unit that outputs the corrected difference image data, wherein:
the additional image data is distributed periodically in the inside-frame area, and the specific attribute of the additional image data indicates that the additional image associated with the additional image data is constituted by dots having an identical, specific color, and the canceling unit corrects the read image data by performing processing for reducing pixel values of pixels corresponding to the dots having the identical, specific color, among pixels included in the inside-frame area.

12. An image forming apparatus comprising:
an addition unit that creates additional image data having a specific attribute, to be added to original image data input from an external source, and that adds the additional image data to the original image data so as to create document image data;
an image forming unit that forms, on a recording medium, on the basis of the document image data, a document image including an original image associated with the original image data and an additional image associated with the additional image data;
an image reader that reads the document image formed on the recording medium by the image forming unit so as to create read image data;
a canceling unit that corrects, on the basis of the specific attribute of the additional image data, the read image data by canceling a difference generated due to the addition of the additional image data so as to create corrected read image data; and
an output unit that outputs the corrected read image data and the original image data,
wherein:
the additional image data is distributed periodically in an inside-frame area, and the specific attribute of the additional image data indicates that the additional image associated with the additional image data is constituted by dots having an identical, specific color, and
the canceling unit corrects the read image data by performing processing for reducing pixel values of pixels corresponding to the dots having the identical, specific color, among pixels included in the inside-frame area.

13. An image forming method comprising:
creating additional image data having a specific attribute, to be added to original image data input from an external source, and adding the additional image data to the original image data so as to create document image data;
forming, on a recording medium, on the basis of the document image data, a document image including an original image associated with the original image data and an additional image associated with the additional image data;
reading the document image formed on the recording medium so as to create read image data;
creating difference image data by calculating a difference between the original image data and the read image data;
correcting, on the basis of the specific attribute of the additional image data, the difference image data by canceling a difference generated due to the addition of the additional image data so as to create corrected difference image data; and
outputting the corrected difference image data,
wherein:
the additional image data is distributed periodically in an inside-frame area, and the specific attribute of the additional image data indicates that the additional image associated with the additional image data is constituted by dots having an identical, specific color, and
the correcting corrects the read image data by performing processing for reducing pixel values of pixels corresponding to the dots having the identical, specific color, among pixels included in the inside-frame area.

14. A printing system comprising:
an addition unit that adds additional image data to original image data to create document image data;
an image forming unit that forms a document image on a recording medium using the document image data;
an image reader that reads the document image formed on the recording medium to create read image data;
a difference image creator that creates difference image data by calculating a difference between the original image data and the read image data;
a canceling unit that creates corrected difference image data by erasing a portion of the difference image data due to the addition of the additional image data; and
an inspection unit that performs inspection to the corrected difference image data.

* * * * *